June 7, 1966  E. M. GOLDNER  3,254,750
COMBINATION TYPEWRITER AND BRAILLEWRITER
Filed June 15, 1964  3 Sheets-Sheet 1

INVENTOR.
Elmer M. Goldner
BY
Hovey, Schmidt, Johnson & Hovey
ATTORNEYS.

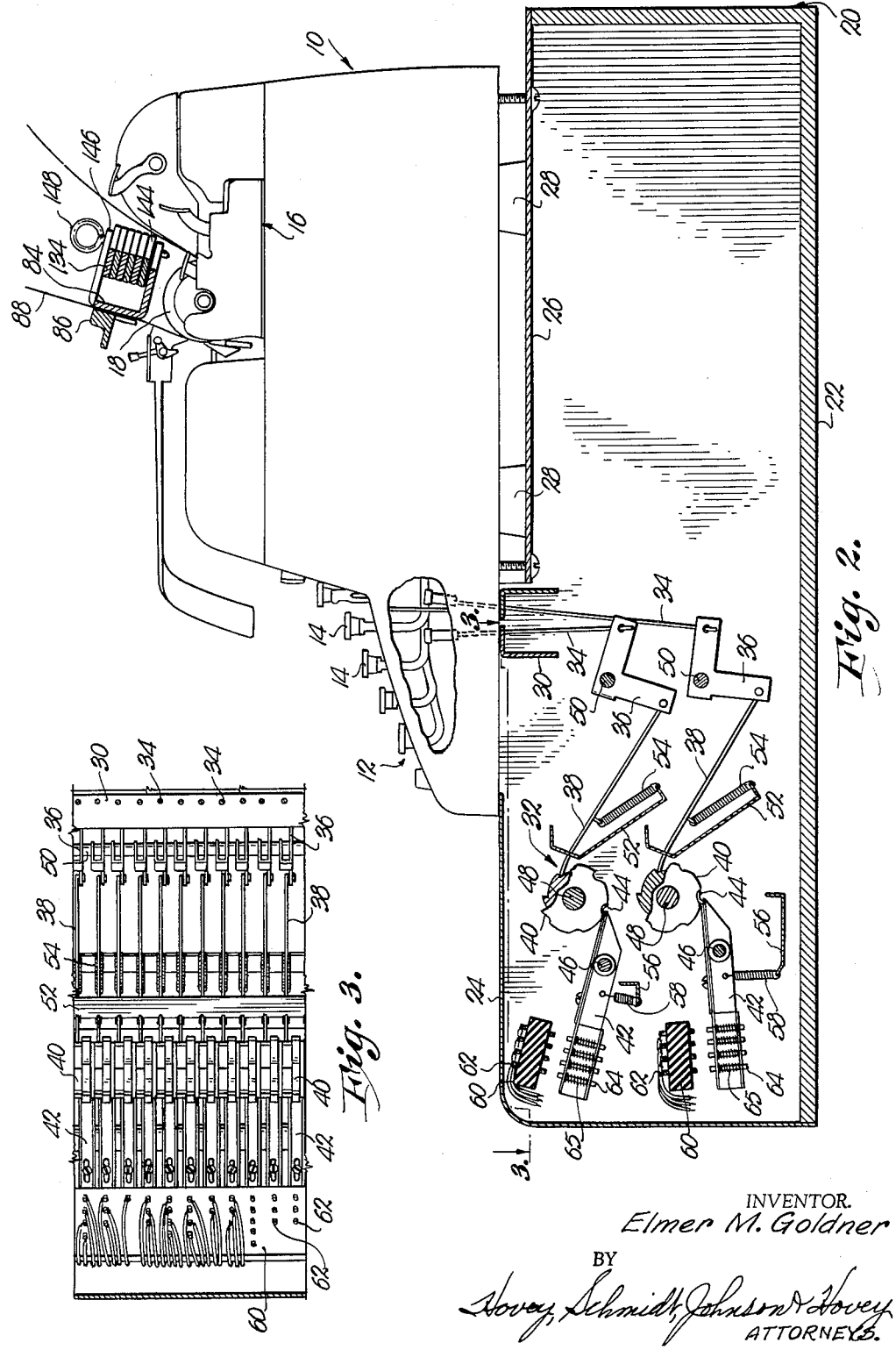

June 7, 1966  E. M. GOLDNER  3,254,750
COMBINATION TYPEWRITER AND BRAILLEWRITER
Filed June 15, 1964  3 Sheets-Sheet 3
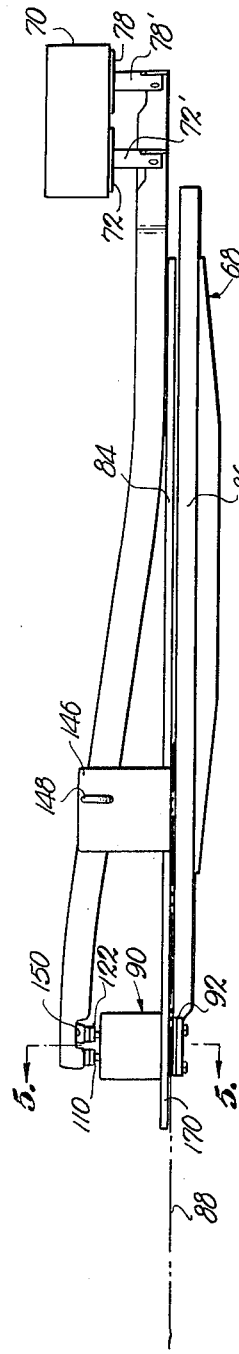
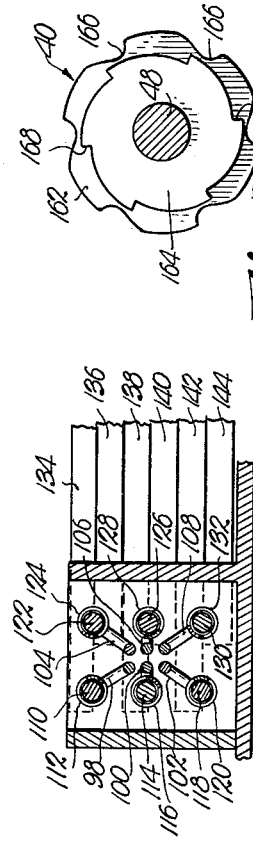
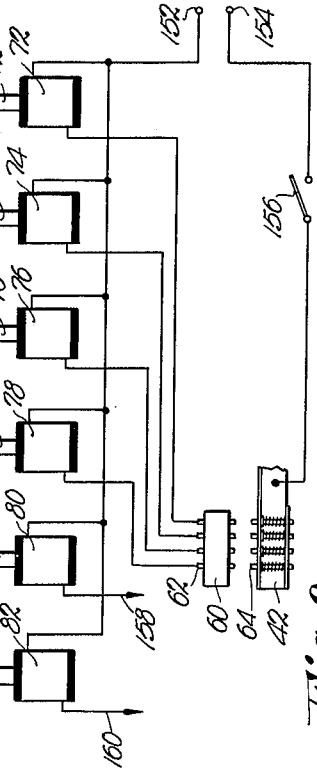
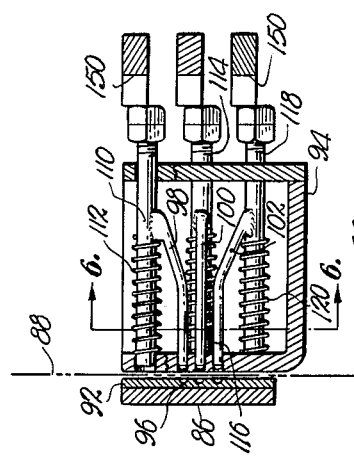
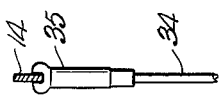
INVENTOR.
Elmer M. Goldner
BY
Hovey, Schmidt, Johnson & Hovey
ATTORNEYS.

3,254,750
COMBINATION TYPEWRITER AND
BRAILLEWRITER
Elmer M. Goldner, Kellerton, Iowa; Maggie L. Goldner, administratrix of said Elmer M. Goldner, deceased
Filed June 15, 1964, Ser. No. 374,912
4 Claims. (Cl. 197—6.1)

This invention relates to a machine utilizing a conventional typewriter keyboard for simultaneously typing printed and braille characters on the same sheet of paper.

Written communication betwen a blind person and an individual having unimpaired vision is difficult and cumbersome since, in most instances, only the blind party has a knowledge of braille. Thus, an intermediary is required to either translate the braille into the printed word or prepare the braille text from printed matter.

Besides the obvious necessity of learning the braille system, an individual with normal vision must practice braille in order to maintain adequate proficiency and, furthermore, must have a braillewriter in order to prepare the braille text. Manifestly, only one who is a worker in this field would usually have the requisite knowledge, proficiency, and equipment to prepare and read braille copy.

It is, therefore, the primary object of this invention to provide a machine for typing braille characters which requires no knowledge of braille by the operator.

It is also an important object of this invention to provide a machine as aforesaid which will type printed and braille characters simultaneously in a manner such that an operator skilled in only one system may correlate the two systems.

It is another important object of the instant invention to provide such a machine which will type the printed and braille characters on the same sheet of paper in separate, horizontal rows vertically spaced from one another, corresponding printed and braille characters being vertically aligned to permit direct correlation by a visually unimpaired operator.

It is still another object of this invention to provide a machine as aforesaid which utilizes a conventional typewriter as a component thereof without substantial modification of the typewriter mechanism being required.

Other objects will become apparent as the detailed description proceeds.

In the drawings:

FIG. 2 is a sectional view taken along line 2—2 in FIG. 1;

FIG. 3 is a sectional view taken along line 3—3 in FIG. 2;

FIG. 4 is a fragmentary plan view of the embossing head and the electromechanical structure for operating the head;

FIG. 5 is a sectional view taken along line 5—5 in FIG. 4;

FIG. 6 is a sectional view taken along line 6—6 in FIG. 5;

FIG. 7 is an enlarged, detailed view of one of the ratchet wheels;

FIG. 8 is an enlarged, detailed view of one of the push rods which is actuated by a typewriter key; and FIG. 9 is a schematic diagram showing one of the switching sections connected to a selected group of solenoids.

Figure 1:
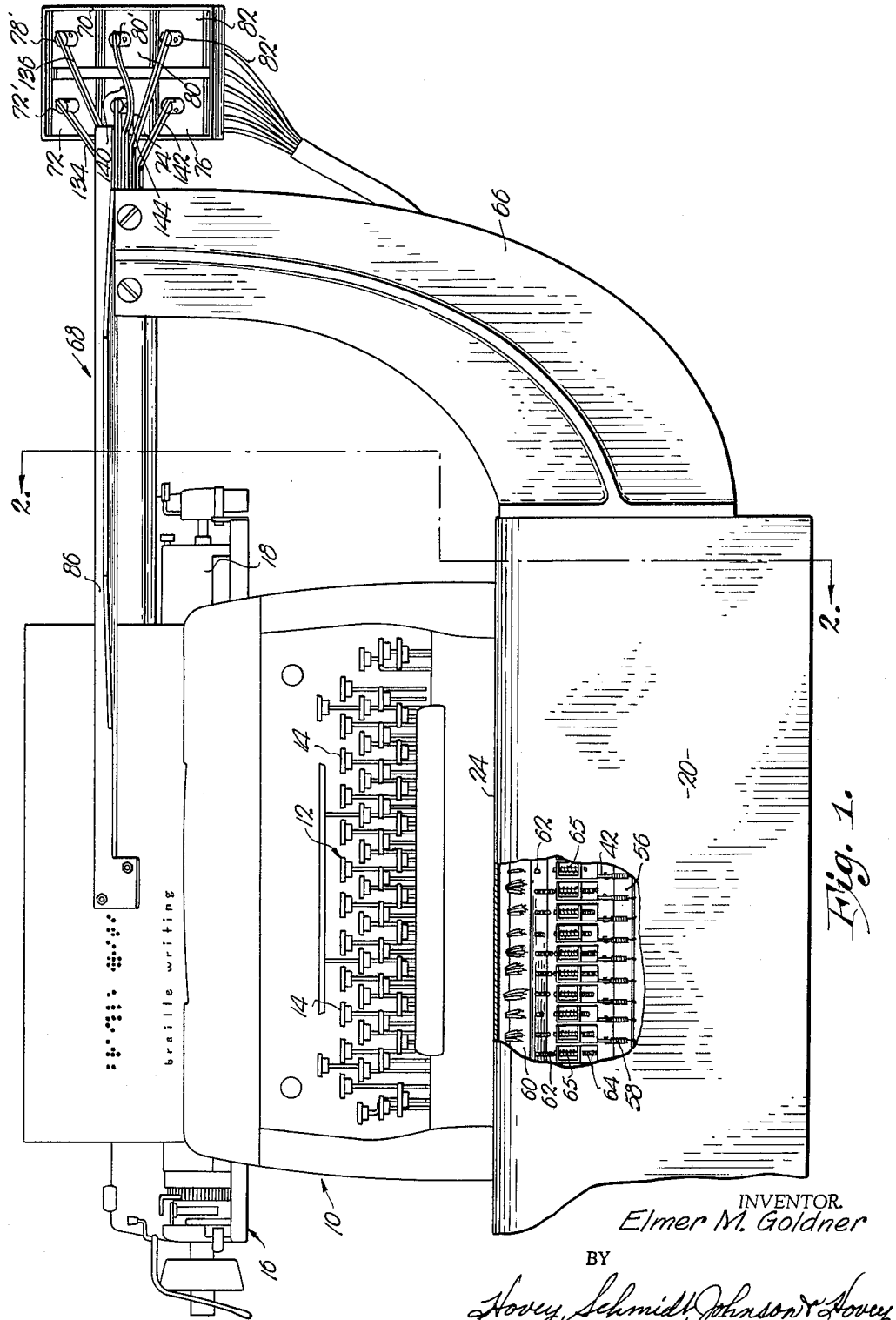
FIGURE 1 is a front elevational view of the combination typewriter and braillewriter, a portion of the housing beneath the typewriter being broken away to reveal details of construction.

Briefly, this invention utilizes a conventional mechanical typewriter, a braille cell embossing head positioned adjacent the platen of the typewriter and receiving the paper emanating therefrom, and means which actuates the appropriate stylus in the head in response to operation of the typewriter keyboard. The only alteration in the typewriter mechanism is in the spacing between letters, which must be lengthened to one quarter of an inch between the centers of the characters in order to accommodate the braille cell. A solenoid or other electromechanical actuator is employed to operate each stylus of the head, energization of an appropriate solenoid or a combination of solenoids being effected by a switching arrangement which operates in response to the depressing of a particular key on the keyboard. In this manner, each key operates a different solenoid or group thereof to form the desired braille character. Simultaneously, the types of the typewriter operate in the usual manner and place printed characters on the page. The corresponding printed and braille characters are in aligned, vertically spaced relationship to one another so that an operator having no knowledge of braille may proofread his own copy and make any corrections needed. Manifestly, the only requisite is that the operator be able to use a conventional typewriter keyboard, with a few, simple and easy to learn exceptions which will be noted hereinafter.

Referring to the drawings, the numeral 10 designates a conventional mechanical typewriter having a keyboard 12 provided with a number of keys 14. Other major subassemblies of the typewriter 10 include a carriage 16 provided with a platen 18.

Typewriter 10 rests on a housing 20 which is preferably composed of an electrically nonconductive substance. Housing 20 includes a base 22 and a front deck 24 and platform 26 spaced above and supported by base 22. Platform 26 is recessed with respect to deck 24 to support the feet 28 of typewriter 10 and maintain the front portion of the typewriter frame nearly flush with deck 24. It should be noted that the typewriter only overlies the edge of deck 24 since the deck terminates in spaced relationship to a cross brace 30 of housing 20, thereby leaving a large opening or passage directly below keyboard 12.

A control mechanism broadly designated 32 is disposed within the front portion of housing 20, mechanism 32 being most clearly shown in FIG. 2. The control mechanism is composed of a number of identical structures, each of such structures being operably coupled with a different key 14 of the typewriter keyboard 12. Two of these structures are visible in FIG. 2, where it may be seen that each comprises an upright push rod 34 connected to a crank 36, a pawl 38 conneced to the crank and in engagement with a ratchet wheel 40, and a swingable element or contactor arm 42 provided with a follower 44 which rides along the periphery of ratchet wheel 40. Element 42, ratchet wheel 40, and crank 36 are free to swing or rotate about respective horizontal shafts 46, 48 and 50 journaled in the sidewalls of housing 20.

A cross member 52 has a row of horizontal apertures therein receiving corresponding pawls 38 and guiding the same along the desired path of travel. Each pawl 38 is normally biased into the position illustrated by a spring 54 interconnecting the pawl and cross member 52. As viewed in FIG. 2, springs 54 bias pawls 38 rightwardly and downwardly toward associated cranks 36.

Another pair of vertically spaced cross members 56 are associated with the two vertically spaced rows of ratchet wheel assemblies, such cross members 56 being employed to mount springs 58, each of the latter being connected to a respective element 42. Springs 58 normally bias the elements into the positions illustrated, the action of springs 58, as viewed in FIG. 2, being vertically downwardly to bias elements 42 in a counterclockwise direction about shafts 46.

A pair of horizontal, vertically spaced bars 60 of insulating material extend across housing 20 adjacent the front thereof and beneath deck 24. Each bar 60 mounts a group of electrical contacts 62, the various groups of contacts being horizontally spaced along the respective bars 60 as may clearly be seen in FIG. 3. A set of contacts 64 is also carried by each of the elements 42 for movement into and out of engagement with the corresponding group of contacts 62. Thus, the many sets of opposed contacts 62 and 64 form switching means, each set of contacts 62 and 64 thereby comprising a section of the switching means under the control of a respective element 42. It may be noted in FIG. 2 that the contacts 62 and 64 there shown are four in number in each case but that, as is clear in FIG. 3, the number of contacts may vary from one to five depending on the particular typewriter key 14 associated therewith. The reason for this variance will become clear hereinafter when the formation of the braille characters is discussed.

In FIG. 1 it may be seen that a curved support 66 is rigid with the right-hand wall of housing 20 and extends outwardly and upwardly therefrom. A horizontal extension 68 is secured to the upper end of support 66, extension 68 being employed to mount a rectangular case 70 which houses six solenoids 72, 74, 76, 78, 80 and 82.

Referring to FIGS. 2 and 4, it may be seen that extension 68 is bifurcated or split to form a pair of horizontally extending legs 84 and 86 which receive a sheet of paper 88 emanating from platen 18. Paper 88 moves vertically through the narrow slot defined by legs 84 and 86 as platen 18 rotates in the usual manner during operation of typewriter 10. A braille cell embossing head 90 is rigidly secured to extension 68 adjacent the left-hand end thereof in overlying relationship to platen 18. As is shown particularly in FIGS. 4-6, head 90 is composed of two parts, a die 92 mounted on leg 86 and a housing 94 rigid with leg 84. Die 92 has six indentations 96 therein, three of which are visible in FIG. 5. Indentations 96 are arranged in the pattern of a conventional braille cell.

Styli 98, 100, 102, 104, 106 and 108 are mounted in housing 94 for reciprocal movement toward and away from corresponding indentations 96 in die 92. The stylus 98 is provided with a reciprocable plunger 110 having a coil spring 112 therearound biasing the plunger away from die 92. The other styli 100-108 also include plungers and springs arranged in identical fashion, such plungers being denoted by reference numerals 114, 118, 122, 126 and 130, respectively, the springs being designated 116, 120, 124, 128 and 132, respectively. Movement of each stylus toward the corresponding indentation 96 against the action of its spring shifts the tip of the stylus into pressure engagement with paper 88 and produces an embossment on the front surface of the paper having a configuration defined by the indentation 96. Thus, when the stylus is retracted, a raised portion is left on paper 88 to form a braille dot. Paper 88 is relatively heavy and is preferably standard braille paper.

Styli 98, 100, 102, 104, 106 and 108 are actuated, respectively, by solenoids 72, 74, 76, 78, 80 and 82. Intercoupling of the solenoids and the styli is effected by six lever arms 134, 136, 138, 140, 142 and 144. The lever arms are stacked in a vertical array and mounted for swinging movement by a bracket 146 extending rearwardly from extension 68. A pivot pin 148 extends downwardly through bracket 146 and apertures (not shown) in the stacked lever arms 134-144, as is clearly illustrated in FIG. 2. The right ends of the lever arms 134-144 are connected with the armatures 72', 74', 76', 78', 80' and 82', respectively, of the solenoids 72-82, while the left ends of the lever arms terminate in slightly spaced relationship to corresponding plungers.

It may be seen by a comparison of FIGS. 4, 5 and 6 that the ends of the various various lever arms adjacent the styli plungers are arranged so that clockwise rotation of each arm (as viewed in FIG. 4) causes movement of the corresponding plunger toward die 92. It is noteworthy that arms 134, 138 and 142 are greater in length than the remaining arms and are each cut away at 150 to clear the plunger aligned therewith but which is under control of another arm.

FIG. 9 illustrates the manner in which the letter "p" is formed in braille when the "p" typewriter key 14 is depressed. A source of electrical power (not shown) is connected to terminals 152 and 154, an On-Off switch 156 being connected in series between terminal 154 and contactor arm 42. It may be seen that solenoid 72 is connected in series between terminal 152 and the right-hand contact 62 illustrated, the solenoids 74, 76 and 78 also being connected in series between terminal 152 and a corresponding contact 62. The remaining solenoids 80 and 82 are shown having leads 158 and 160 extending therefrom but disconnected from any of the contacts 62 there illustrated. This is because only solenoids 72-78 are required to form the letter "p". Manifestly, the circuit of FIG. 9 illustrates only one circuit arrangement corresponding to a particular letter of the alphabet, it being evident that as many of these circuits will be employed by the apparatus as there are letters of the alphabet and other braille characters to be formed if desired. Thus, the many rows of contacts 62, illustrated in FIGS. 1 and 3, are each employed only when the particular character corresponding thereto is to be formed upon depressing of the appropriate typewriter key.

In operation, assuming that the letter "p" is to be formed, the typewriter key is depressed causing downward movement of the corresponding push rod 34. The detail view of FIG. 8 shows that each push rod is provided with a head 35 having a slot in the upper end thereof forming a cradle for receiving the downwardly moving key 14. As the push rod 34 continues its downward movement, the corresponding crank 36 rotates about shaft 50 and advances pawl 38 leftwardly, as viewed in FIG. 2, to rotate ratchet wheel 40. This, in turn, causes contactor arm 42 to rotate to a disposition placing contacts 64 in engagement with contacts 62. Contacts 64 may be provided with springs 65, as shown in FIG. 2, to permit yielding of contacts 64 upon engagement with contacts 62. As is evident from FIG. 9, this closes the power circuit to solenoids 72-78 causing retraction of their armatures 72'-78' which, in turn, shifts lever arms 134, 136, 138 and 142 to actuate the styli 98, 100, 102 and 104.

At this juncture it is instructive to note the enlarged view of ratchet wheel 40 shown in FIG. 7. This view is in a direction axially of shaft 48 but oppositely to the view of the ratchet wheels shown in FIG. 2. FIG. 7 illustrates that each wheel 40 is actually formed of two integral wheel sections 162 and 164. Section 162 is of larger diameter than section 164 and is provided with a number of contoured depressions 166. Wheel section 164, however, is provided with peripheral notches 168. The pawl 38 engages notches 168 to rotate wheel 40 during downward movement of key 14, while follower 44 on contactor arm 42 rides along the periphery of the larger section 162 and thus is responsive to the arcuate depressions 166. The various depressions 166 and notches 168 are in substantial alignment and are positioned such that contactor arm 42 swings contacts 64 into engagement with contact 62 during downward motion of the key-actuated push rod 34.

The cumulative effect of the ratchet wheel structure is to effect closure of the appropriate switching section before the associated typewriter key 14 reaches the limit of its downward movement. This feature insures that both the printed and the braille characters will be placed on paper 88 prior to shifting of carriage 16 by the typewriter mechanism in the conventional manner. Furthermore, follower 44 moves from one depression 166 to the next depression 166 during the downward flow of the typewriter key, thereby causing reopening of the contacts 62–64 and return of the contactor arm 42 to its normal position prior to release of the typewriter key and actuation of another key. In this manner, jamming of the mechanism is prevented.

It may be appreciated from the foregoing that the typewriter subassembly of the apparatus is operated in the conventional manner, except that braille paper is employed and is threaded through the slot defined by legs 84 and 86 of extension 68 so that the braille characters will be embossed on the paper by head 90 simultaneously with the operation of the types. Thus, the printed characters and the braille characters appear in aligned, vertically spaced relationship as illustrated in FIG. 1. It may be noted that, should an error inadvertently be made, one unskilled in braille may readily see which braille character is in need of correction. To facilitate such corrections, the left end of leg 84 adjacent head 90 presents an eraser plate 170 which forms a solid backing for the braille paper. Thus, the dot or dots of the character to be corrected may be erased while the paper is in the machine through the use of a conventional braille eraser.

The only required modifications of the typewriter keyboard relate to the formation of certain necessary braille composition signs. In the braille system, capital letters are indicated by a particular composition sign, and numbers are indicated through the use of a composition sign preceding the letters "a" through "j." When so designated, such letters correspond to the ten digits of the decimal system. The modification of the keyboard, however, is readily effected since the entire row of numbers on a conventional typewriter keyboard is not used in braille and may be employed to form the necessary composition signs. It is evident that sufficient number keys and other unused keys will remain to permit other useful composition signs to be formed, many of which, such as the period and the question mark, may be associated with a typewriter key already so designated. Thus, only minimal knowledge of braille is required for operation of the combination typewriter-braillewriter apparatus.

The present invention leads itself to a number of modifications in the operation thereof depending on the product that is desired by the operator. For example, an ordinary sheet of typewriter paper could be superimposed on the braille paper and a sheet of carbon paper interleaved therebetween. In this mode of operation, only the braille paper would be passed through the slot between legs 84 and 86. Thus, the original would be written in printed characters, while the duplicate would contain both printed and braille characters.

It should be understood that use of the instant invention with a conventional typewriter will not enable the operator to form the various contractions utilized in the braille system to shorten the copy. However, an individual would have to be highly skilled in braille in order to know these contractions and be able to effectively use the same. However, if the apparatus is to be employed strictly as a braillewriter, it is evident that a keyboard having additional keys thereon corresponding to the various contractions could be employed so that all of the characters of the braille system could be formed.

Having thus described the invention, what is claimed as new and desired to be secured by Letters Patent is:

1. In combination with a typewriter having a keyboard provided with a plurality of keys and a carriage having a platen, a braillewriter comprising:
   a braille cell embossing head having a die provided with a number of identations, and a shiftable, dot-producing stylus for each identation respectively;
   means mounting said head within the path of travel of a recording paper emanating from said platen;
   said styli being normally spaced from the die for receiving said paper between the styli and the die;
   control structures coupled with respective keys for actuation thereby; and
   means interposed between said structures and said styli for shifting the latter in response to operation of said keys, and including electrically responsive operating means associated with said styli for selectively shifting the latter, and switching means for controlling operation of said operating means and having a plurality of switching sections;
   each of said structures including a rotatable ratchet wheel, a pawl for driving the wheel, means coupling the corresponding key with the pawl for transmitting driving motion to the latter, and a shiftable element coupled with a corresponding switching section for operating the latter;
   said element being provided with a follower engaging said wheel.

2. In combination with a typewriter having a keyboard provided with a plurality of keys and a carriage having a platen, a braillewriter comprising:
   a braille cell embossing head having a die provided with a number of indentations, and a shiftable, dot-producing stylus for each indentation respectively;
   means mounting said head within the path of travel of a recording paper emanating from said platen;
   said styli being normally spaced from the die for receiving said paper between the styli and the die;
   control structures coupled with respective keys for actuation thereby; and
   means interposed between said structures and said styli for shifting the latter in response to operation of said keys, and including an electrically responsive actuator for each stylus respectively, switching means for controlling operation of said actuators and having a plurality of switching sections, and linkage means for operably coupling each of the actuators with the corresponding stylus;
   each of said structures including a rotatable ratchet wheel, a pawl for driving the wheel, means coupling the corresponding key with the pawl for transmitting driving motion to the latter, and a shiftable element coupled with a corresponding switching section for operating the latter;
   said element being provided with a follower engaging said wheel.

3. The invention of claim 1, wherein said means coupling the corresponding key with the pawl comprises a rotatable crank, a push rod pivotally attached to the crank and disposed for engagement by the key during operation thereof, and means pivotally attaching the pawl to the crank.

4. The invention of claim 1, wherein said switching means includes support means, each of said switching sections including first contact means mounted on said support means and second contact means mounted on the corresponding element, the latter being disposed for movement of the second contact means into and out of engagement with the first contact means during rotation of said wheel.

(References on following page)

References Cited by the Examiner

UNITED STATES PATENTS

| | | | |
|---|---|---|---|
| 529,572 | 11/1894 | Wait | 197—6.1 |
| 1,414,229 | 4/1922 | Steinkraus | 197—6.1 |
| 1,767,247 | 6/1930 | Kurowski et al. | 197—6.1 |
| 2,842,245 | 7/1958 | Frey | 197—20 |
| 3,032,164 | 5/1962 | Watari | 197—6.1 |

FOREIGN PATENTS

| | | |
|---|---|---|
| 552,352 | 4/1923 | France. |
| 1,109,850 | 2/1956 | France. |
| 576,872 | 5/1958 | Italy. |
| 580,809 | 8/1958 | Italy. |
| 611,396 | 10/1960 | Italy. |

ROBERT E. PULFREY, *Primary Examiner.*

EDGAR S. BURR, *Assistant Examiner.*